| United States Patent [19] | [11] Patent Number: 5,031,227 |
|---|---|
| Raasch et al. | [45] Date of Patent: Jul. 9, 1991 |

[54] EDGE ENHANCEMENT AND SMOOTHING IN DIGITAL IMAGES

[75] Inventors: Charles F. Raasch, El Toro; Gregory A. Roberts, Costa Mesa; Mark A. Conboy, Mission Viejo, all of Calif.

[73] Assignee: Loral Aerospace Corp., New York, N.Y.

[21] Appl. No.: 588,790

[22] Filed: Sep. 27, 1990

[51] Int. Cl.$^5$ ............................................. G06K 9/56
[52] U.S. Cl. ....................................... 382/22; 382/27
[58] Field of Search .......................... 382/22, 27, 54

[56] References Cited

U.S. PATENT DOCUMENTS

| 4,365,304 | 12/1982 | Ruhman et al. | 364/515 |
|---|---|---|---|
| 4,703,513 | 10/1987 | Gennery | 382/27 |
| 4,731,865 | 3/1988 | Sievenpiper | 382/54 |
| 4,797,806 | 1/1989 | Krich | 364/900 |
| 4,827,533 | 5/1989 | Tanaka | 382/54 |
| 4,860,373 | 8/1989 | Hartless et al. | 382/41 |
| 4,918,742 | 4/1990 | Simonds | 382/27 |

*Primary Examiner*—Stephen Brinich
*Attorney, Agent, or Firm*—Harry G. Weissenberger; Edward J. Radlo; Keith L. Zerschling

[57] ABSTRACT

Edge definition in FLIR images is improved by assigning to each pixel (X) the average intensity value of that 3×3 pixel sub-matrix (30a-30i) containing the pixel (X) which exhibits the smallest edge value. Apparatus for obtaining that intensity value in real time is disclosed. This process can be iteratively repeated on the same image, with each iteration creating more enhanced edges and greater area smoothing between edges.

4 Claims, 5 Drawing Sheets

|     |     |     |     |     |     |     |
|-----|-----|-----|-----|-----|-----|-----|
| 1-1 | 1-2 | 1-3 | 1-4 | 1-5 | 1-6 | 1-7 |
| 2-1 | 2-2 | 2-3 | 2-4 | 2-5 | 2-6 | 2-7 |
| 3-1 | 3-2 | 3-3 | 3-4 | 3-5 | 3-6 | 3-7 |
| 4-1 | 4-2 | 4-3 | ✕   | 4-5 | 4-6 | 4-7 |
| 5-1 | 5-2 | 5-3 | 5-4 | 5-5 | 5-6 | 5-7 |
| 6-1 | 6-2 | 6-3 | 6-4 | 6-5 | 6-6 | 6-7 |
| 7-1 | 7-2 | 7-3 | 7-4 | 7-5 | 7-6 | 7-7 |

EDGE ENHANCEMENT AND SMOOTHING IN DIGITAL IMAGES

FIELD OF THE INVENTION

This invention relates to image processing, and more particularly to a method of sharpening intensity edges while smoothing the image area between edges in digital video images.

BACKGROUND OF THE INVENTION

Object recognition by forward-looking infrared (FLIR) imaging involves comparing selected portions of FLIR images to predetermined appearance criteria of known objects. For this purpose, and for the sharpness of the image to an observer in general, it is desirable to clearly define the edges of objects in the image and to smooth the image areas between the edges.

The FLIR image, like any digital video image, it composed of individual pixels (typically 512×512) of varying intensity. In the raw image, edges of objects tend to be diffuse, i.e. the intensity of adjacent pixels gradually and (in noisy images) erratically varies across the true edge. Under these circumstances, complex recognition algorithms have to be applied to many pixels, and recognition becomes excessively computation-intensive and can be inaccurate.

The spatial averaging techniques conventionally applied to noisy images exacerbate the edge definition problem, and separate algorithms for noise reduction and for edge definition have to be used on each pixel if the image is to be segmented for recognition purposes or for visual enhancement of a displayed image. Because FLIR imaging must be done in real time (typically at 30 frames per second), computation intensiveness is a very real practical problem.

Prior art in this field is as follows: U.S. Pat. No. 4,860,373 to Hartless et al.; No. 4,827,533 to Tanaka; No. 4,797,806 to Krich; No. 4,731,865 to Sievenpiper; No. 4,703,513 to Gennery; and No. 4,365,304 to Ruhman et al., all of which involve related image processing schemes, but none of which teach the substitution of least-edge-value averages of pixel sub-matrices for a pixel value.

DISCLOSURE OF THE INVENTION

The invention provides simultaneous noise reduction and edge enhancement by computing, for each pixel (X) of the image (referred to herein as the master pixel) the average intensity of the nine possible 3×3 pixel sub-matrices within a 5×5 pixel matrix (30a–30i) which include the master pixel, and assigning to the master pixel (X) the average intensity of the sub-matrix exhibiting the smallest edge value within its sub-matrix. The edge value of a sub-matrix (e.g. 30a) is the maximum difference in absolute value between the average intensity value of any sub-matrix (30b, 30e, 30d, 40h, 40f, 40a, 40b, 40c) centered upon a pixel immediately adjacent to the center pixel of the examined sub-matrix (30a).

BRIEF DESCRIPTION OF THE DRAWINGS

FIG. 2 illustrates a pixel matrix considered in the invention.

DESCRIPTION OF THE PREFERRED EMBODIMENT

Figure 1A:
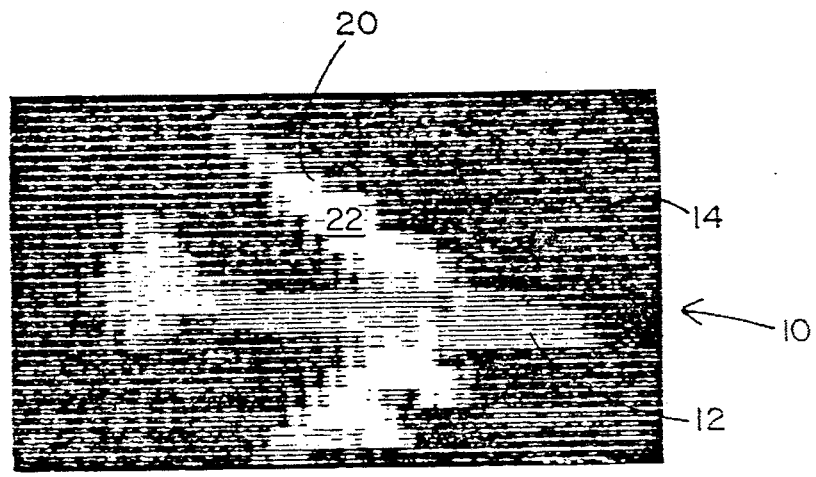
FIG. 1a depicts a raw FLIR image of an aircraft.
Figure 1B:
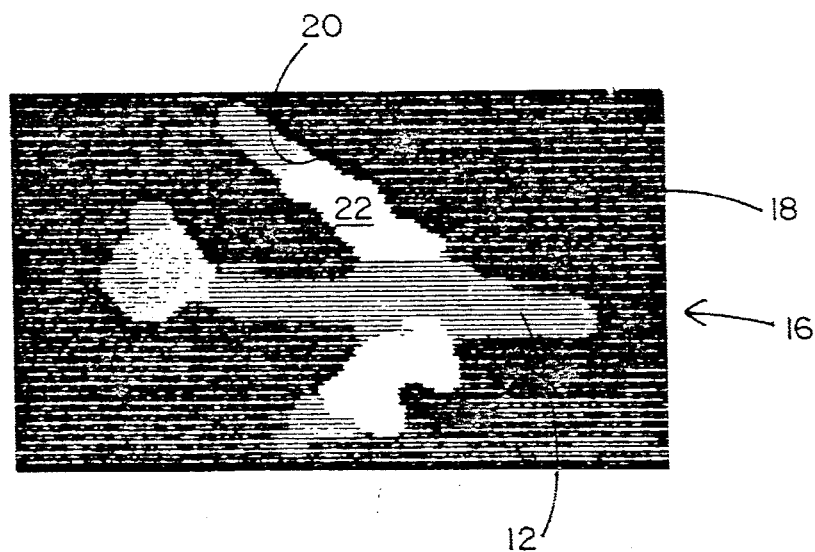
FIG. 1b is the same image when processed by the invention.

FIG. 1a shows an enlarged small section 10 (about 200×100 pixels) of a raw FLIR image in which an aircraft 12 is depicted against a generally dark but noisy background 14. The objective of the invention is to convert the raw image 10 into the optimized image 16 of FIG. 1b in which the outline of the aircraft 12 is sharply defined against a now uniform dark background 18.

During any clock cycle of the digital scan of image 10, a modification of an image pixel X, herein called the master pixel, is being undertaken in accordance with the invention. This is done in the following manner: As shown in FIG. 2 a 7×7 pixel matrix 20 centered about the master pixel X can be defined. The pixels of the matrix 20 have been designated as 1—1 through 7—7 in FIG. 2, the master pixel X being the fourth pixel of line 4. The actual edge of the aircraft wing 22 in the image 10 is indicated by the dotted line 24 as a matter of example.

Figure 3:
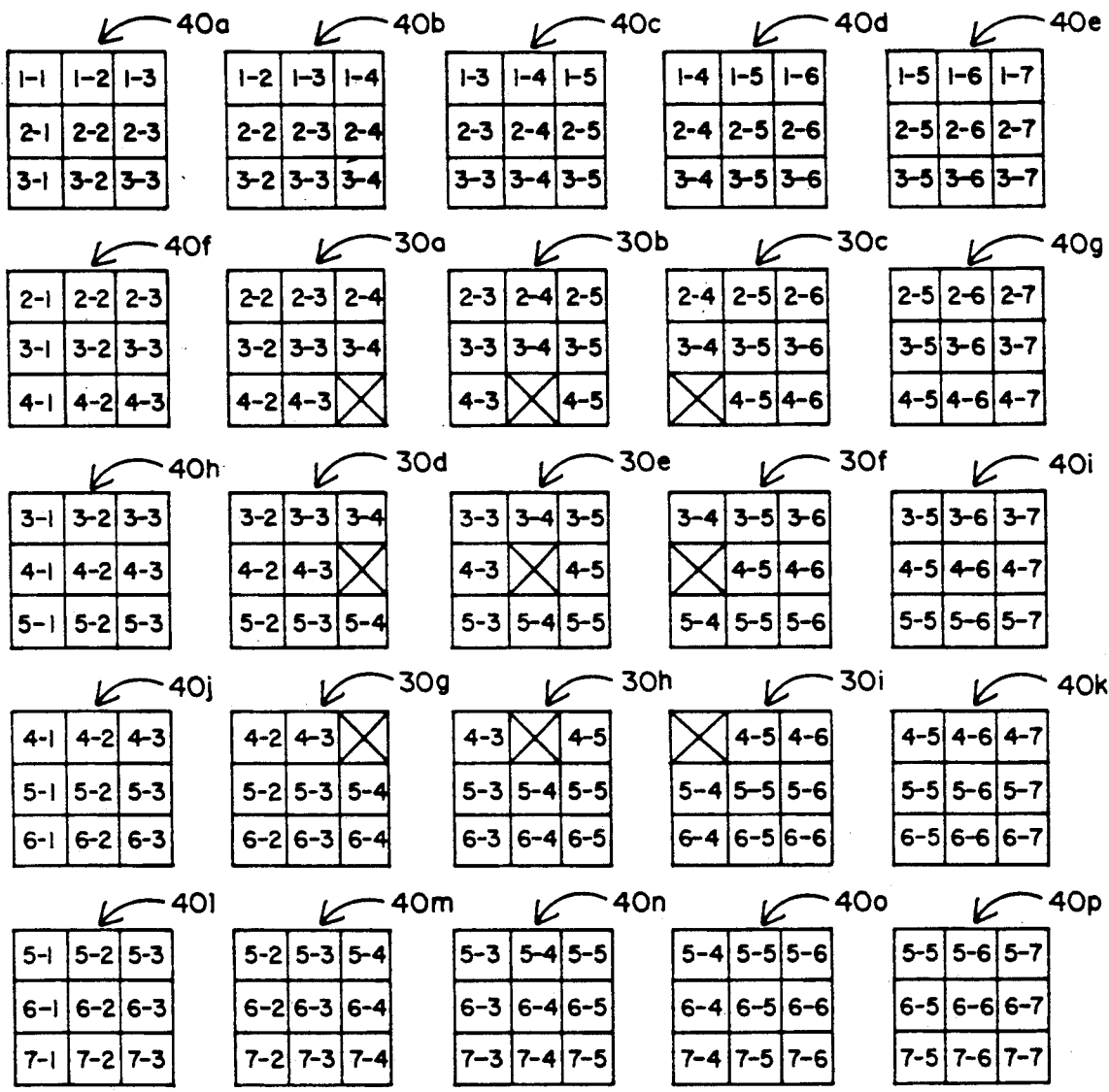
FIG. 3 shows the sub-matrices of the matrix of FIG. 2.

In accordance with the invention, the intensity average of each of the nine sub-matrices 30a through 30i shown in FIG. 3 is now calculated, as is the edge value of each of these nine sub-matrices. The edge value of a sub-matrix centered on a given pixel is defined as the absolute value of the maximum absolute value difference between the average intensity of that sub-matrix and the average intensity of any of the eight possible sub-matrices centered on an immediately adjacent pixel. For example, the edge value of sub-matrix 30a is the maximum absolute value difference between the average intensity of sub-matrix 30a and the average intensity of any of sub-matrices 30b, 30e, 30d, 40h, 40f, 40a, 40b, and 40c. The master pixel X is then assigned an intensity value equal to the average intensity of the sub-matrix from the set 30a–30i which was the lowest edge value.

When the correct intensity value has been computed and substituted for the intensity value of pixel X in the image 10 (which, in the example of the drawings, puts it clearly into the wing 22), the process is repeated on the next adjacent pixel of the image 10 on the next scan clock cycle. The result of the process, when carried out over the whole image 10, is the sharply defined aircraft of FIG. 1b, which a conventional recognition algorithm can readily identify. It will be seen that the process of this invention simultaneously averages out noise and sharpens the edges in the image 10. This invention also has the advantage that the image can be repetitively processed if desired to further enhance the edges and smooth the areas between edges in each iteration.

Figure 4:
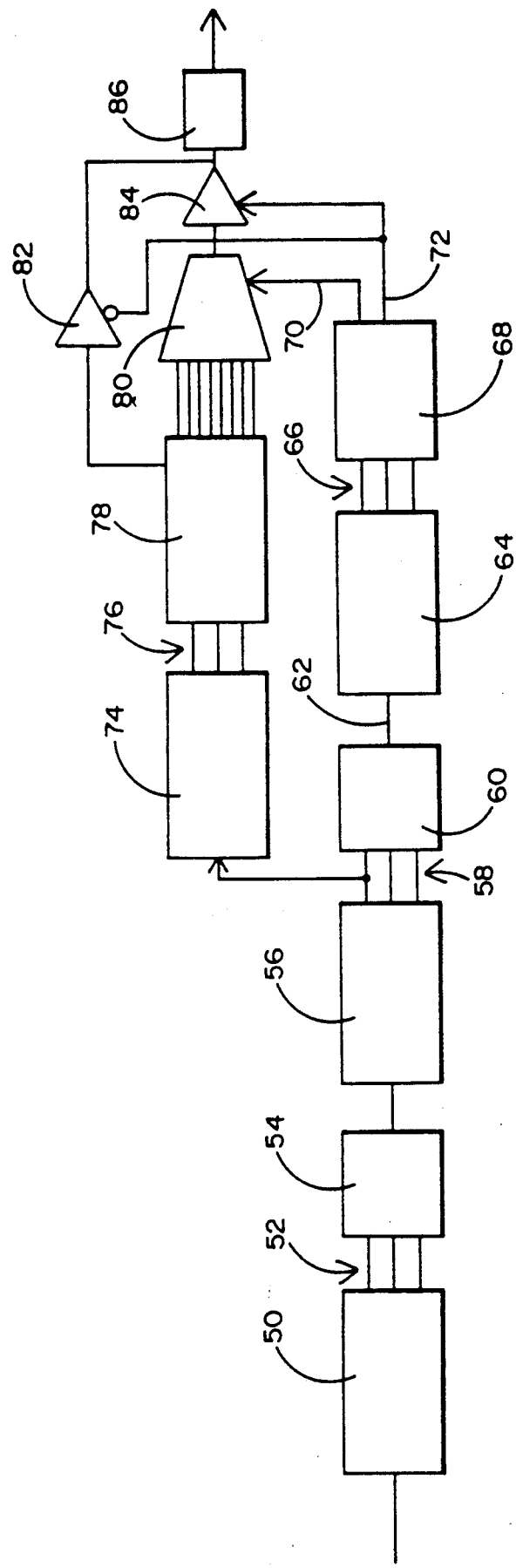
FIG. 4 is a block diagram of a preferred circuitry carrying out the invention.
Figure 5:
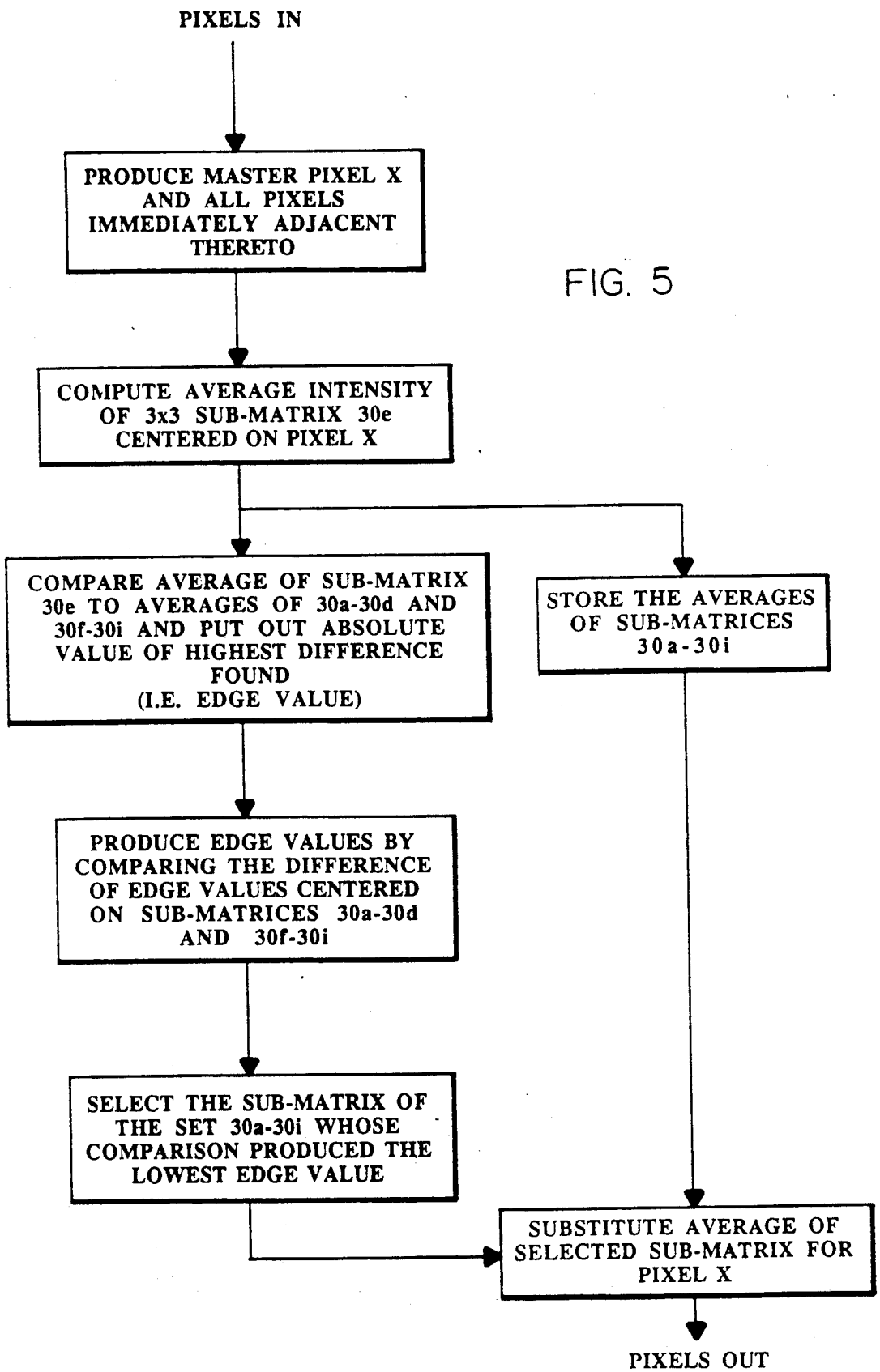
FIG. 5 is a flow diagram illustrating the operations performed by the circuit of FIG. 4.

FIG. 4 shows an apparatus adapted to carry out, in real time, the process of this invention as depicted in the flow chart of FIG. 5. A line-delay video shift register (VSR) 50 receives the raw image information in the normal video line scan sequence and stores three lines of the image 10 at any given time. Groups of three vertically aligned pixels of the image 10 such as pixels 2-3, 3-3, and 4-3 are sequentially read out lines 52, one group per clock cycle, and stored in the 3×3 average filter 54. On each clock of the video scan, the filter 54 averages the last three groups of pixels received to produce the average intensity value of the 3×3 sub-matrix represented thereby (e.g. sub-matrix 30e).

The average values put out by filter 54 are stored in VSR 56 which stores three lines of averages at any given time. Groups of three averages of vertically aligned sub-matrices such as 30b, 30e and 30h are read out sequentially on lines 58 into an edge image creator 60. On each clock, the edge image creator 60 compares the average of one sub-matrix (e.g. 30a) to the averages of the eight sub-matrices surrounding it (e.g. 40a, 40b, 40c, 30b, 30f, 30d, 40b and 40f), and puts out the maximum absolute value difference (i.e. the edge value of sub-matrix 30a) on line 62.

The edge value on line 62 is fed into buffer VSR 64 which stores three lines of edge values. Groups of three edge values from vertically aligned sub-matrices centered in adjacent lines (e.g. sub-matrices 30b, 30e, 30h) are read out sequentially on lines 66 and are stored in the neighborhood minimum detector 68. The detector 68 examines a 3×3 set of edge values of the sub-matrices, e.g. sub-matrices 30a through 30i, and selects the sub-matrix of that set which has the lowest edge value. The average intensity of the selected sub-matrix is the intensity value which will be assigned to the center pixel X of the set's center sub-matrix 30e. The output of detector 68 is a three-bit selection signal 70 and a one-bit selection signal 72. Together, the selection signals 70 and 72 indicates which of the nine sub-matrices 30a through 30i has the lowest edge value.

The average intensity value appearing on the first line of lines 58 is fed to a timing alignment VSR 74 which again stores three lines of averages and sequentially puts out groups of averages of three vertically aligned sub-matrices centered in adjacent lines over lines 76 to a latch array 78. The latch array at any given time stores three consecutive groups of averages from VSR 74 (e.g. the averages of sub-matrices 30a through 30i) and feeds those nine values to an 8:1 one-byte multiplexer 80 and to a one-byte gate 82. The output of multiplexer 80 as selected by the selection signal 70 is fed through a one-byte gate 84 to an output latch 86. The inverted control input of gate 82 causes either gate 82 or gate 84 to be open, in accordance with the selection signal 72.

It will be seen that the intensity value stored in output latch 86 is the average intensity value of the 3×3 sub-matrix from the set 30a–30i which has the lowest edge value. This intensity value can now be substituted by conventional means for the actual intensity value of the subjected pixel X in the FLIR imaging circuits, as indicated by FIG. 5.

We claim:

1. A method of simultaneously smoothing image areas and enhancing their edges in a digitized image, comprising the steps of:
   (a) producing successive master pixels of said digitized image;
   (b) producing, for each said master pixel, a matrix of pixels centered upon said master pixel;
   (c) computing, for each of a plurality of sub-matrices of said matrix each containing said master pixel, the average intensity of said sub-matrix and the edge value thereof, the edge value of a sub-matrix being the maximum absolute difference between the average intensity of that sub-matrix and the average intensities of at least some of the sub-matrices of the same size centered upon a pixel of that sub-matrix;
   (d) assigning to said master pixel the average intensity of the sub-matrix within the set of sub-matrices containing said master pixel which has the lowest edge value.

2. The method of claim 1, in which said sub-matrices are all the possible 3×3 matrices within a 7×7 matrix.

3. Apparatus for simultaneously smoothing and enhancing the edges of objects in a digitized image, comprising:
   (a) image information defining a line-scanned image composed of pixels;
   (b) line delay means for simultaneously generating intensity information of a master pixel and pixels adjacent thereto;
   (c) average filter means connected to said line delay means for computing the average intensity of a pixel sub-matrix centered upon said master pixel;
   (d) average buffer means connected to said average filter means for producing the average intensity values of pixel sub-matrices including said master pixel;
   (e) edge image creator means connected to said average buffer means for producing, for each of said sub-matrices, an edge value representing the maximum absolute difference between the average intensity of a given sub-matrix and the average intensities of the sub-matrices centered upon pixels adjacent to the center pixel thereof;
   (f) edge buffer means connected to said edge image creator means for producing said edge values for the set of sub-matrices including said master pixel;
   (g) neighborhood minimum detector means connected to said edge buffer means for producing an indication of which sub-matrix of said set has the lowest edge value;
   (h) latch array means operationally connected to said average filter means for storing the average intensity values of the sub-matrices including said master pixel; and
   (i) output means connected to said neighborhood minimum detector means and said latch array means for outputting as the intensity value of said master pixel the average value of the sub-matrix of said set indicated by said neighborhood minimum detector means as having the lowest edge value.

4. The apparatus of claim 3, in which said sub-matrices are 3×3 pixels in size.

* * * * *